United States Patent [19]

Karapetian

[11] Patent Number: 5,143,416

[45] Date of Patent: Sep. 1, 1992

[54] VEHICLE BODY

[76] Inventor: Vahe Karapetian, 4801 Los Feliz Blvd., Los Angeles, Calif. 90027

[21] Appl. No.: 611,299

[22] Filed: Nov. 8, 1990

Related U.S. Application Data

[63] Continuation of Ser. No. 362,236, Jun. 6, 1989, Pat. No. 4,991,897.

[51] Int. Cl.⁵ .............................................. B62D 27/00
[52] U.S. Cl. ...................................... 296/29; 296/183; 296/209; 403/246; 256/65
[58] Field of Search ................. 296/29, 181, 182, 183, 296/209, 203; 105/407, 408, 409, 418; 248/511, 201, 231.1; 403/245, 246; 256/65, 66

[56] References Cited

U.S. PATENT DOCUMENTS

| | | | |
|---|---|---|---|
| 678,258 | 7/1901 | King | 105/408 X |
| 1,806,173 | 5/1931 | McWilliams et al. | 105/409 |
| 2,022,869 | 12/1935 | Reid | 296/183 |
| 2,222,335 | 11/1940 | Dietrich | 105/409 |
| 2,489,670 | 11/1949 | Powell, Jr. | 296/28 |
| 2,585,976 | 2/1952 | Teeter | 189/34 |
| 2,600,140 | 6/1952 | Torseth | 296/28 |
| 2,801,597 | 8/1957 | Ecoff | 105/407 X |
| 2,814,997 | 12/1957 | Deam | 105/418 |
| 2,991,116 | 7/1961 | Andrews | 296/181 |
| 3,088,420 | 5/1963 | Faverty et al. | 296/182 |
| 3,097,877 | 7/1963 | Erlandsen | 296/28 |
| 3,151,573 | 10/1964 | Eggert | 296/29 X |
| 3,363,231 | 2/1965 | Grosgebauer et al. | 340/52 |
| 4,671,562 | 6/1987 | Broadbent | 296/181 |
| 4,767,132 | 8/1988 | Avery | 280/414 |

FOREIGN PATENT DOCUMENTS

| | | | |
|---|---|---|---|
| 569086 | 1/1959 | Canada | 105/408 |
| 2278556 | 2/1976 | France . | |
| 85/05337 | 12/1985 | World Int. Prop. O. . | |

Primary Examiner—Margaret A. Focarino
Assistant Examiner—Gary C. Hoge
Attorney, Agent, or Firm—Lyon & Lyon

[57] ABSTRACT

A vehicle body positionable on spaced chassis members through Z-shaped bars attached to the chassis members and laterally extending floor members in turn attached to the Z-shaped bars. The laterally extending floor members define a floor assembly and are arranged in interlocking engagement with side rails extending along either side of the floor assembly. The side rails includes flanges into which the floor members extend. Outwardly extending flanges on the floor members support columnar rib members which extend upwardly to define the structural walls of the body. Crown members abut against thte upper ends of the rib members as well as similarly constructed roof members extending laterally across the body. Frame clips having a base and spaced upstanding attachment legs are employed to affix the rib members and roof members to the aforementioned structural elements. Rivet fasteners are contemplated as well as bolts and welds in appropriate locations.

4 Claims, 3 Drawing Sheets

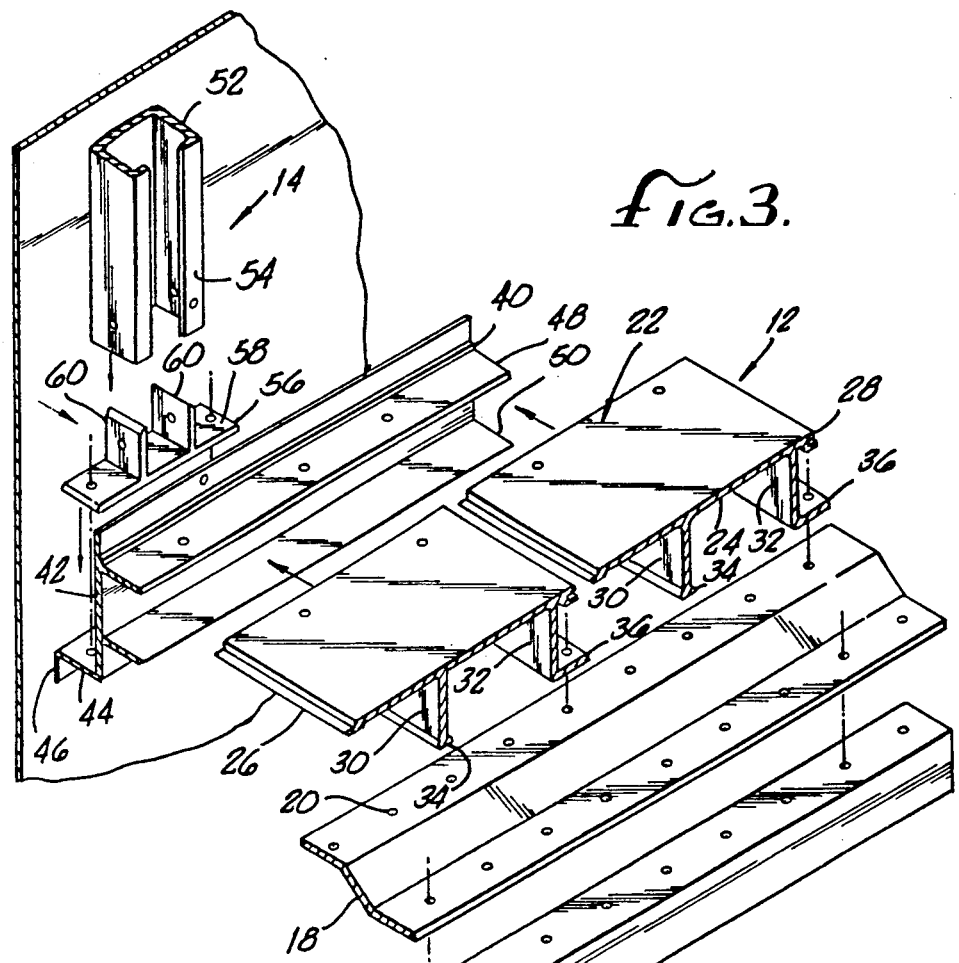
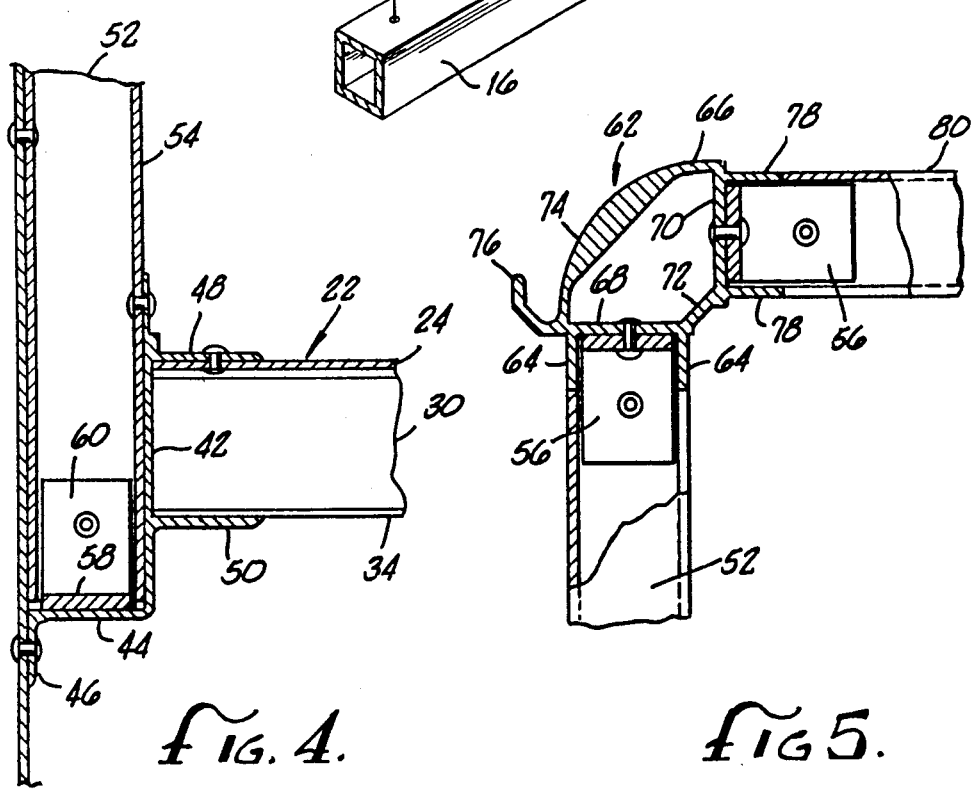

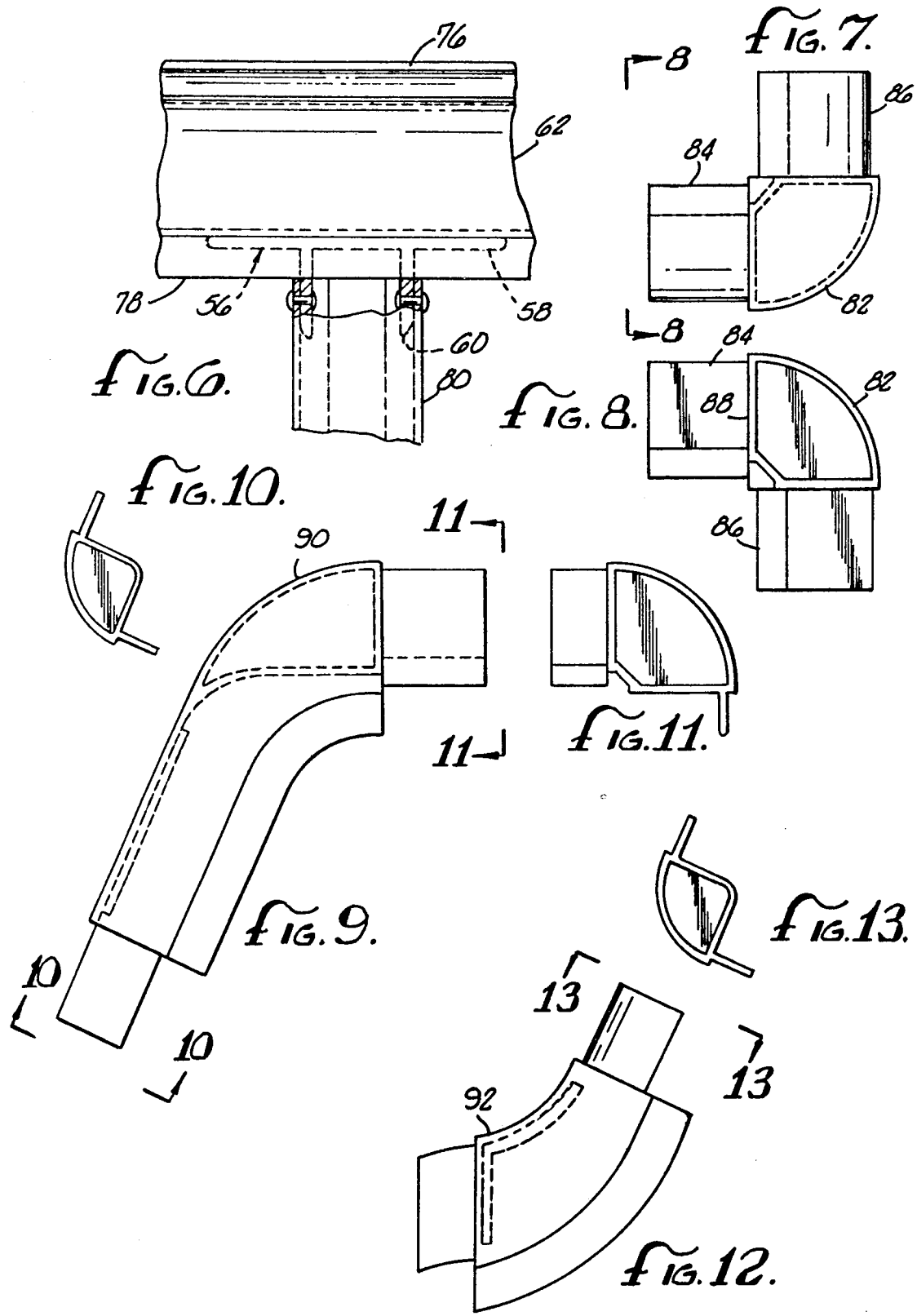

VEHICLE BODY

RELATED APPLICATIONS

This is a continuation of U.S. Pat. application Ser. No. 362,236, filed Jun. 6, 1989, now U.S. Pat. No. 4,991,897.

BACKGROUND OF THE INVENTION

The field of the present invention is vehicle body structures.

Paneled bodies for large vehicles are frequently constructed with a bed mounted to a chassis, an internal frame structure and panels mounted to the structure. Such designs have typically included considerations regarding weight, durability and cost. With high volume production, specialized forming and machining can be undertaken to optimize design goals without cost penalties. Where low volume production is undertaken, construction tends to be more labor intensive in working with common materials and structural elements. Such circumstances lower cost efficiency; and greater design compromise is often experienced.

SUMMARY OF THE INVENTION

The present invention is directed to assemblies for vans and truck bodies. The present system may find utility in both high and low production quantities and allows for variation in body dimensions without requiring substantial retooling. To this end standardized components having a limited number of cross sections are employed.

In a first aspect of the present invention, specially formed side rails may be employed having an outwardly extending flange and two inwardly and mutually spaced flanges. They can provide a mounting base for the body and a frame structure for the bed of the vehicle to create an assembly where substantial rigidity can be achieved for crash worthiness of the vehicle. These side rails may be extruded, allowing for the use of uniform components easily cut to the appropriate length for utility in a range of designs in either small or large production.

A second aspect of the present invention contemplates crown members associated with columnar rib members and roof members. The rib and roof members conveniently are of quadrangular cross section to abut spaced flanges of the crown members. Frame clips and fasteners may be employed to fix the several components in place. Along with corner caps, such a frame may be developed using a limited number of elements. The crown members may be identical extrusions; and identical members may be used as the roof members and columnar rib members cut to appropriate length. Frame clips to retain the elements of the frame together may also be easily formed as a uniform extrusion.

A further aspect of the present invention is the provision of mounting bars fixed to the chassis which provide a convenient mounting and tie down mechanism for the vehicle. Through association between the floor members and the mounting bars, the entire body is easily interfaced with varying chassis designs and strengthened structurally as well.

Accordingly, it is an object of the present invention to provide an improved vehicle body structure. Other and further objects and advantages will appear hereinafter.

BRIEF DESCRIPTION OF THE DRAWINGS

FIG. 3 is an exploded perspective view of the floor and wall assembly detail.

FIG. 4 is a cross-sectional view of the joint between the floor and wall of the present invention.

FIG. 5 is a cross-sectional view of the wall and roof joints of the present invention.

FIG. 6 is a plan view of the roof and crown member assembly of the present invention.

FIG. 7 is a plan view of a corner element of the present invention.

FIG. 8 is a bottom view of the device of FIG. 7.

FIG. 9 is a side view of another corner element of the present invention. 10.

FIG. 10 is a view taken along line 10—10 of FIG. 9.

FIG. 11 is a view taken along line 11—11 of FIG. 9.

FIG. 12 is a side view of an inside corner element of the present invention.

FIG. 13 is a view taken along line 13—13 of FIG. 12.

DETAILED DESCRIPTION OF THE PREFERRED EMBODIMENT

Figure 1:
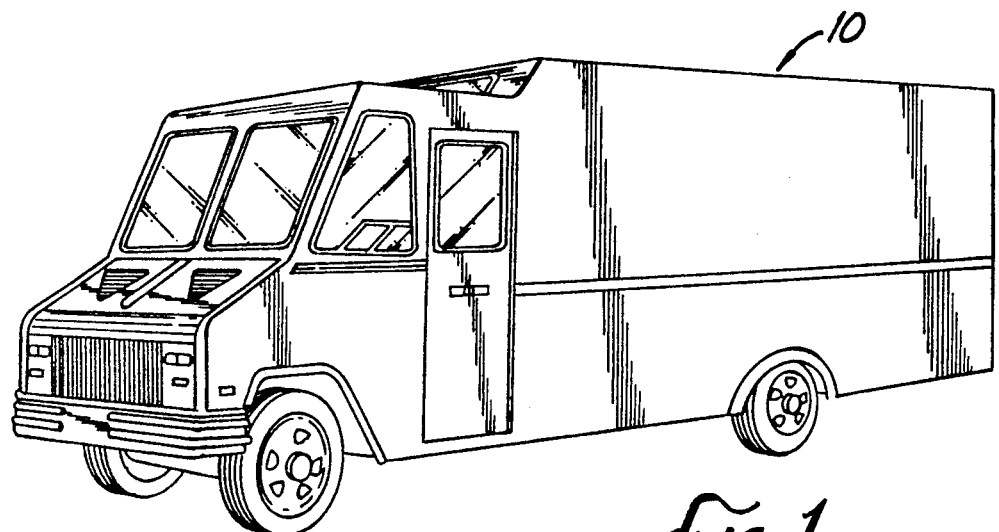
FIG. 1 is a perspective view of a vehicle contemplated for the present invention.
Figure 2:
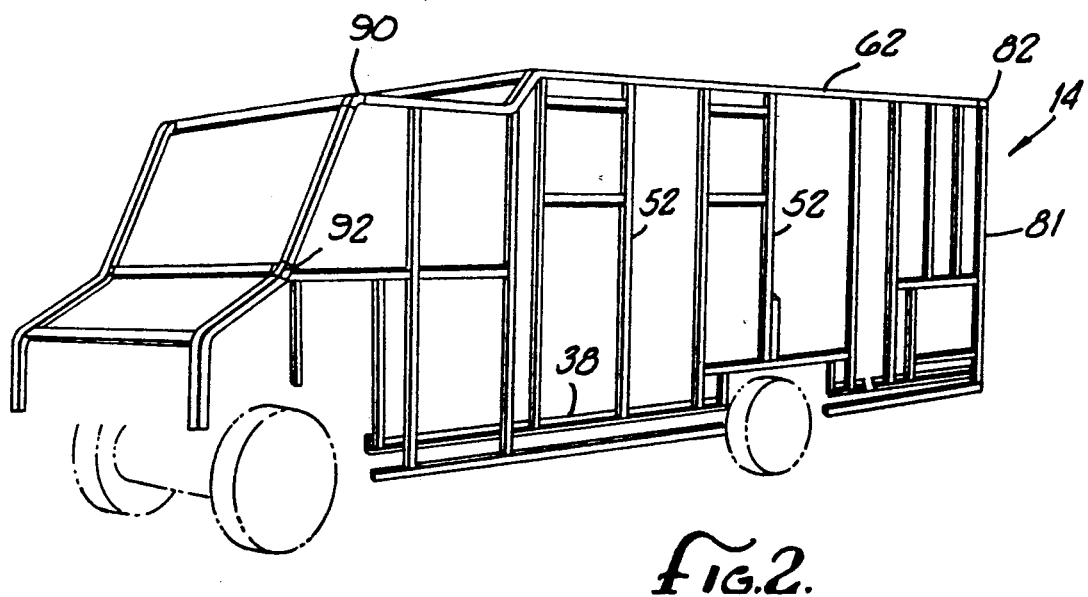
FIG. 2 is a perspective view of the present invention.

Turning in detail to the drawings, a van, generally designated 10, is disclosed. Typically the chassis and power train are provided by any one of several manufacturers. To this chassis a specialized body is constructed. Such bodies typically employ a bed, or floor, panelling and some form of structure to support the panelling. Additional hardware is employed to fit specific contemplated uses.

In the preferred embodiment of the present invention, a floor, generally designated 12, and structure, generally designated 14, are contemplated. On the structure 14, panelling is employed to define the enclosure as in FIG. 1.

Turning to the supporting structure, the chassis is typically provided with box section rails 16 extending the length of the bed area. Typically two rails 16 are provided which are substantially parallel to create a chassis structure which is mounted on the suspension of the vehicle. To provide a rigid and accurate mounting structure for the floor of the vehicle, Z-shaped bars 18 are affixed to the chassis rails 16. These bars 18 may be fixed by means of fasteners such as bolts or rivets or may be welded in place. Fastening the bars 18 to the rail 16 has been found preferred. The Z-shape of the bars provides for clearance of such fasteners by the superposed floor 12. Fastener holes 20 are aligned along the upper extent of the bar 18 for attachment to the floor 12. Each bar 18 is conveniently arranged such that the upper extent is outwardly of the rails 16 to provide additional width to the support base for the body. The bars 18 are typically of substantial structural rigidity, the bars being of steel in the preferred embodiment.

Mounted atop the Z-shaped bars 18 is the floor 12. The floor 12 is defined by a plurality of floor members, generally designated 22. The floor members 22 are elongate and extend transversely of the longitudinal axis of the vehicle. The floor members 22 are considered of structural significance to the overall body configuration. An extrusion process is employed for the fabrication of the floor members 22 which are preferably of aluminum for weight reduction. The floor members 22 each include a floor panel 24. The floor panel in the preferred embodiment is approximately 8⅛ inches wide and runs substantially the width of the truck. The floor panels 24 include tongues 26 and grooves 28 so as to fit together and provide a continuous, relatively smooth flooring for the vehicle.

Integrally formed in the extrusion process with the floor panel 24 are two spaced support rails 30 and 32. These support rails 30 and 32 extend normal to the plane of the floor panel 24. The support rail 30 is located substantially inwardly of the edge of the floor panel 24 while support rail 32 is adjacent to the groove 28 at one edge of the panel 24. This arrangement provides for support at roughly equal intervals along the floor. By placing the support rail 32 adjacent the groove 28, the support rail and underside of the groove act to support the tongue 26 and free edge of the adjacent floor panel 24 against downward strain.

The spaced support rails 30 and 3 provide structural support against bending of the member 22 along its length. In the preferred embodiment, the rails 30 and 32 rest upon the two spaced Z-shaped bars 18 and extend outwardly therefrom to the edge of the vehicle body. A foot 34 is created along support rail 30 by relatively short flanges extending the length of the rail. Associated with the support rail 32 is a mounting foot 36 extending laterally from the distal end of the rail 32. Fasteners are employed through the mounting foot 36 to fix the floor and body structure to the bars 18 through fastener holes 20. This attachment of the floor members 22 to the bars 18 through the mounting feet 36 fixes not only the individual floor members 22 in place, but the entire vehicle body on the chassis. By locating the mounting foot 36 adjacent the groove 28 in each floor member 22, the upper portion of the groove 28 also acts as a tie down for the tongue 26 of the adjacent floor member 22. As the floor members 22 are preferably extruded, the same tooling may be employed for accommodating van construction of varying widths as well as lengths.

Outwardly of the floor assembly defined by the floor members 22, two side rails 38 and 40 extend substantially the length of the body. The side rails 38 and 40 are preferably extruded aluminum and have identical cross-sections. Each side rail 38 and 40 includes a vertically disposed web 42. Extending laterally outwardly along the length of the web 42 is a lower flange 44. The lower flange 44 is shown to be located at the lower edge of the web 42 and itself includes a vertically disposed mounting flange 46 extending downwardly from the lower flange 44. The width of the lower flange 44 is designed such that the structural members placed on the lower flange 44 and extending upwardly adjacent the web 42 will also be flush with the mounting flange 46 such that a common panel may be juxtaposed and fastened to both the mounting flange 46 and the structure positioned on the lower flange 44.

Extending laterally inwardly from the web 42 are spaced mounting flanges 48 and 50. These spaced mounting flanges 48 and 50 are arranged to receive therebetween the floor members 22. Thickness of the floor members 22 is defined by the upper surface of the floor panel 24 and the undersurface of the feet 34 and 36. The flanges 48 and 50 are designed to receive the floor members 22 closely therebetween. One or the other or both of the flanges 48 and 50 may then be fastened to the floor members 22. This construction including the assembled floor members 22 and the side rails 38 and 40 in interlocking relationship provides substantial strength which is understood to provide significant protection against excessive damage in a crash. The space mounting flanges 48 and 50 are arranged such that web 42 extends upwardly of the upper such mounting flange 48. This upwardly extending portion of the web 42 acts as a mounting element for attachment of upwardly extending frame structure for the body.

Through the side rails and a similar construction at the rear of the vehicle when appropriate, a shelf and vertical wall are created about the vehicle for location and anchoring of the upper body structure. The shelf is provided by the lower flange 44 and the wall by the web 42.

In the preferred embodiment, the upper body structure includes columnar rib members 52 of substantially quadrangular cross-section formed as channels with rib flanges 54 extending inwardly on the open side of the channel. These rib members 52 are preferably extruded as well and will be shown to be used for a substantial amount of the fabrication of the upper body structure. The columnar rib members 52 are supported on the lower flange 44 and extend upwardly against the web 42 and beyond.

To mount the columnar rib members 52 in place, frame clips 56 are employed. The frame clips 56 may also be extruded and cut to short lengths so as to fit within the quadrangular shape of the columnar rib members 52. The frame clips 56 each include a base 58 and two spaced attachment legs 60 extending normally to the base 58. The attachment legs 60 are positioned inwardly of the ends of the base 58 such that the ends of the base 58 may provide locations for placement of fasteners to fix the base on a supporting structure. In association with the lower end of the rib members 52 and the side rails 38 and 40, frame clips 56 are positioned on and affixed to the lower flange 44. The frame clips 56 may be welded, riveted or otherwise fastened to the lower flange 44 to retain their location thereon. The upstanding rib members 52 and the frame clips 56 are sized such that the attachment legs 60 fit closely within the interior of the rib members 52 in order that fasteners may be positioned through the attachment legs 60 in a perpendicular direction and through the walls of the rib members 52 to anchor the upper body structure to the side rails 38 and 40. To further retain the rib members 52, the upper end of the web 42 on the side rails 38 and 40 may be used to fasten the adjacent rib flanges 54 thereto.

Looking to the upper body structure, the rib members 52 each extend upwardly to a second, upper end. Crown members 62 are positioned atop the ends of the rib members 52. These crown members 62 extend the length of the sides and back of the vehicle and are extruded members of identical cross-section. The crown members 62 include spaced wall flanges 64 which are of equal width to the mating width of the rib members 52. Consequently, the ends of the spaced wall flanges 64 abut against the upper ends of the rib members 52. Frame clips 56 are then employed with the upper ends of the rib members 52 and the crown members 62 in the same manner as in association with the lower flanges 44.

The crown members 62 include a crown body 66 which has a first flat wall 68 from which the spaced wall flanges 64 extend. A second flat wall 70 extends perpendicularly to the first flat wall 68. The two flat walls 68 and 70 are attached along adjacent edges by means of a beveled section 72. Extending between the other edges of the fat walls 68 and 70 is a rounded section 74. The rounded section 74 may be of any convenient profile, circular having been selected for the preferred embodiment. Extending outwardly of the first flat wall 68 past the rounded section 74 is a gutter 76.

The crown member 62 further includes spaced roof flanges 78 extending outwardly from and generally normal to the second flat wall 70. These spaced roof flanges 78 are constructed like the spaced wall flanges 64 such that they can abut against members having the same cross-section as the rib members 52. Roof members 80 identical to the columnar rib members 52 extend across between crown members 62 and are fastened by frame clips 56 in the same manner as are the columnar rib members 52.

To complete the upper body frame structure, rear corner members 81 are contemplated having the same cross-section as the crown members 62 without the gutter 76 or with the gutter removed. Further, cast elements 82 have been designed for the corners of the structure. A rear corner element 82 includes three plugs 84, 86 and 88 which are associated with the crown members 62 and a rear corner member 81. Bodies which have more than a simple box structure may conveniently employ other corner members for ease of fabrication. A rounded front corner element 90 is also illustrated as is a inside corner element 92. Plugs on either ends of these devices allow them to be assembled with additional crown members 62. The uppermost corner on the vehicle 10 as seen in FIG. 1 is accomplished by a simple bending of the crown members 52. The next forward corner is supplied by the front corner element 90 while the concave corner element 92 is found along the sides of the vehicle below the windshield.

To complete the body, panels are positioned on the roof such that they extend between the crown members 62 and are supported by the roof members 80. All panels are then fastened, preferably by rivets, to the structural members. Side panels are similarly arranged and affixed to the columnar rib members 52, the mounting flange 46 and the outer flange of the spaced flanges 64. Additional conventional hardware may also be incorporated to form other portions of the vehicle.

Accordingly, a structure for a vehicle body has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A vehicle body comprising
   two spaced side rails to either side and extending longitudinally of the vehicle, each said side rail being integrally formed including in cross section a vertically disposed web, a lower flange extending laterally outwardly of said web, and having a vertically disposed mounting flange extending downwardly from the outer end of said lower flange, and at least one mounting flange extending laterally inwardly of said web;
   a floor assembly including floor members extending from one said side rail to the other said side rail and to said mounting flanges one each said side rail, said floor member being attached to said mounting flanges;
   rib members positioned on and extending upwardly from said lower flange and affixed to said vertically disposed side rail webs, said rib members being channels in cross section with each having an open side with rib flanges extending longitudinally of said channels and toward one another along said open side thereof, each said web extending upwardly of said mounting flanges on each said side rail and said rib flanges being fastened to said webs above said mounting flanges;
   frame clips, each said frame clip including a base and spaced attachment legs extending normal to said base from inwardly of the ends of said base, said base being fastened to said lower flange outwardly of said spaced attachment legs, said spaced attachment legs extending into one end of a said rib member, fitting closely therein, said attachment legs each being fastened to said rib member.

2. The vehicle body of claim 1 wherein said side rails and said floor members are extrusions.

3. The vehicle body of claim 1 wherein each said floor member is fixed to a said spaced mounting flange on each said side rail.

4. The vehicle body of claim 1 wherein said rib members extend outwardly as to be flush with said vertically disposed mounting flanges.

* * * * *